United States Patent
Tokarz et al.

(10) Patent No.: US 6,224,944 B1
(45) Date of Patent: *May 1, 2001

(54) METHOD OF PROTECTING A SURFACE

(75) Inventors: Marek Tokarz, Kungälv; Michael Persson, Göteborg, both of (SE); Roman Kozlowski, Krakow (PL)

(73) Assignee: EKA Nobel AB, Bohus (SE)

(*) Notice: Subject to any disclaimer, the term of this patent is extended or adjusted under 35 U.S.C. 154(b) by 0 days.

This patent is subject to a terminal disclaimer.

(21) Appl. No.: 08/330,101

(22) Filed: Oct. 27, 1994

Related U.S. Application Data

(63) Continuation of application No. 07/944,976, filed on Sep. 15, 1992, now abandoned.

(30) Foreign Application Priority Data

Sep. 20, 1991 (SE) .................................................. 9102737

(51) Int. Cl.[7] .............................. E01C 11/24; B05D 3/10; B05D 5/00
(52) U.S. Cl. ................... 427/344; 427/397.7; 427/419.2; 427/419.3; 427/136; 427/299
(58) Field of Search .................. 427/136, 299, 427/397.7, 419.2, 419.3, 344

(56) References Cited

U.S. PATENT DOCUMENTS

| | | |
|---|---|---|
| 1,607,762 | 11/1926 | Laurie . |
| 2,244,325 | 6/1941 | Bird ...................... 252/313 |
| 2,574,902 | 11/1951 | Bechtold et al. ...................... 252/313 |
| 3,007,878 | 11/1961 | Alexander et al. .................. 252/313 |
| 3,139,406 | 6/1964 | Mindick et al. ...................... 252/313 |
| 3,252,917 | 5/1966 | Mindick et al. ...................... 252/313 |
| 3,620,978 | 11/1971 | Moore, Jr. ............................. 252/313 |
| 3,699,049 | 10/1972 | Pluta et al. ............................ 252/309 |
| 3,719,607 | 3/1973 | Moore, Jr. ............................. 252/313 |
| 3,745,126 | 7/1973 | Moore, Jr. ............................. 252/313 |
| 3,751,276 | * 8/1973 | Beyer et al. ...................... 427/430.1 |
| 3,859,153 | 1/1975 | Beyer et al. .......................... 161/182 |
| 3,860,476 | * 1/1975 | Moore ................................... 427/203 |
| 3,894,572 | * 7/1975 | Moore ................................... 427/403 |
| 3,956,171 | 5/1976 | Moore, Jr. ......................... 252/313 S |
| 4,006,030 | 2/1977 | Yoshida et al. ......................... 106/74 |
| 4,423,096 | * 12/1983 | Jackson .............................. 427/397.7 |
| 4,451,388 | 5/1984 | Payne ................................... 252/313 |
| 5,747,171 | * 5/1998 | Tokarz et al. ..................... 427/397.7 |

FOREIGN PATENT DOCUMENTS

| | | |
|---|---|---|
| 953605 | 8/1974 | (CA) . |
| 1265550 | 3/1972 | (GB) . |

OTHER PUBLICATIONS

WPI 83–23642K/10, JP 58015059, Onoda Cement KK, Inorganic Hardenable compsn, (no date).
WPI 81–69053D/38, JP 56098409, Nippon Steel Corp, Alkali resistant blast furnaces, (no date).
F. A. Simko, "Modified Antislip Polish Additive", Soap and Chemical Specialties, Jan. 1963, pp 97, 99, 101, 111.
Japanese Abstract (Basic) JP0121287, Aug. 25, 1989, Silane Impregnation Agent Composition.
Chemical Abstracts, vol. 114, No. 2, Jan. 14, 1991,Columbus, OH, Abstract No.

* cited by examiner

*Primary Examiner*—Shrive Beck
*Assistant Examiner*—Michael Cleveland
(74) *Attorney, Agent, or Firm*—Burns, Doane, Swecker & Mathis, L.L.P.

(57) ABSTRACT

The invention concerns a method of protecting a surface of a carbonatic material from corrosion, the method comprising treatment of the material surface with an acidic cationic silica sol, the pH of the sol preferably being from about 4 to about 7. The invention also concerns a new silica sol useful for performing the method and a method of preparing the new silica sol. Further, the invention concerns carbonatic material comprising a surface layer of silica, the surface of the silica particles comprising a polyvalent metal oxide/hydroxide.

9 Claims, No Drawings

METHOD OF PROTECTING A SURFACE

This application is a continuation of application Ser. No. 07/944,976, filed Sep. 15, 1992 now abandoned.

The invention concerns a method of protecting a surface of a carbonatic material from corrosion, the method comprising treatment of the material surface with an acidic cationic silica sol, the pH of the sol preferably being from about 4 to about 7. The invention also concerns a new silica sol useful for performing the method and a method of preparing the new silica sol. Further, the invention concerns a carbonatic material comprising a surface layer of silica, the surface of the silica particles comprising a polyvalent metal oxide/hydroxide.

Many buildings, ordinary houses as well as historical monuments and statues, are made of porous carbonate rich material such as limestone, dolomite, marble or calcareous sandstone which materials are sensitive to pollutants present in the air, particularly the oxides $SO_X$, $NO_X$ and $CO_2$ giving acids when dissolved in rain water. It has been established that a major cause of limestone deterioration is acidic rain and dry deposition of $SO_2$ into the stone pore system, i.e. corrosive reaction progressing between the rainfalls, for which reason also material non-exposed to rain becomes deteriorated.

It has been found that the dominating deterioration factor of carbonatic stone is the formation of a hard black crust on the surface of the stone, the crust mainly consisting of $CaSO_4.2H_2O$ (gypsum) and depositions of dust and dirt. The crust detaches very easily from the underlying stone, and when exposed to rain water, the gypsum dissolves and is transported through the pore system deep into the bulk of the stone where it crystallizes during the drying period, disrupting the stone fabric.

A common method of preserving stone involves treatment with water repellents, for example silicon organic products such as alkylsilanes or silicon resins, preventing the penetration of water into the stone and hindering the damage due to crystallization of gypsum in the pores. However, the treatment does not hinder the corrosive reaction at the stone surface and therefore does not counteract the formation of the gypsum crust which can easily be detached from the underlying stone. Further, water solutions of salts appearing behind the silicone treated layers lead to accelerated decay of the stone. Moreover, the silico-organic materials are relatively expensive and must also be applied as solutions in organic solvents.

Another method involves coating of the stone with lime sacrificial layers, introducing fine reactive calcite at the stone surface and thus creating particularly favorable conditions for the corrosive reaction to occur. Therefore, the lime coating treatment must be repeated after a certain time interval, and after some time also the surface of the coated stone can be affected by the corrosive reaction.

U.S. Pat. No. 4,423,096 discloses treatment of ceramic construction materials with a composition comprising a silica sol having finely divided granular ceramic powder suspended therethrough. The patent does not mention cationic sol and treatment of carbonatic material is not mentioned.

U.S. Pat. No. 3,252,917 relates to the production of "salt free" cationic silica sol. The sol is said to be useful for waterproofing building material constructed from hydraulic binding agents such as concrete or mortar, the sol being incorporated together with the other components during preparation of the material. The patent also discloses treatment of asbestos plates, cork plates or the like, but does not mention surface treatment of solid carbonatic material.

Thus, there is a current demand for a method of protecting solid carbonatic building material against pollutants present in the air. It is therefore an objective of the invention to provide a method of inhibiting the corrosion caused by acid rain and by dry deposition of $SO_2$ at the surface of carbonatic materials. It is also an objective of the invention to prevent water from reaching the bulk of a porous material without stopping it from breathing. It is another objective of the invention to provide an effective, non-toxic and comparatively inexpensive agent for treating the surface of a carbonatic material.

According to the invention, the above objectives have been achieved by providing a method of protecting a surface of a carbonatic material, particularly a material having a high content of calcium carbonate and comprising a pore system, the method comprising treatment of the surface with an acidic cationic silica sol, the pH of the sol suitably being from about 4 to about 7, preferably from about 5 to about 7, most preferably from about 5 to about 6. Cationic silica sol refer to an aqueous sol comprising dense, non-agglomerated positively charged particles, the surface of the particles comprising a polyvalent metal oxide/hydroxide, preferably aluminum oxide/hydroxide.

Without being bound to any theory, the following mechanism behind the stone protection is assumed. At slightly acidic pH, i.e. below the iso-electric point of the metal oxide/hydroxide on the $SiO_2$ particles in the sol, which point in the case of alumina is between 6 and 8, the metal oxide/hydroxide is in its protonated form, the particles thus comprising a great number of positively charged groups. When the surface of a carbonatic material, such as carbonatic stone, is contacted with the weakly acidic sol, the carbonate dissolves slightly and reacts with $H^+$ to $HCO_3^-$. The resulting deprotonation of the sol particles brings about a fast increase of the pH in the sol and gelling of the metal oxide/hydroxide near its zero-point of charge. Since the supply of proton-binding species proceeds from the surface of the carbonate grains, the gelling proceeds at the stone surface, coating it with a thin dense protective layer mainly consisting of silica and metal oxide, suitably from about 0.05 to about 2 mm thick, preferably from about 0.1 to about 0.2 mm thick, partly above the stone surface and partly in the outer pores. The portion above the stone surface should preferably be thinner than 1 mm, most preferably thinner than 0.2 mm. It has been found that the protective layer is effectively prevented from being washed out of the stone surface. The silica protects the carbonatic material against acids and also restrains rain water from penetrating into the stone pore system. On the other hand, the protective layer has been found to be permeable to water vapour, enabling the stone to breath and preventing moisture from being permanently entrapped in the pores.

In order to avoid corrosion caused by easily soluble salts, the silica sol used should contain as small amounts as possible of both dissolved anions and cations. The conductivity at pH 4 should preferably be less than about $3000 \cdot 10^{-6}$ S/cm, most preferably less than about $500 \cdot 10^{-6}$ S/cm. Chloride and other halide ions are particularly harmful, and the content of those ions should preferably be less than 0.05 mol/liter, most preferably less than 0.01 mol/liter.

Cationic silica sols comprising alumina or other polyvalent metal oxides/hydroxides are well known and commercially available, for example under the trademark Bindzil® CAT 80 (Eka Nobel AB, Bohus Sweden). The preparation of cationic sols involve surface modification of an anionic sol and is described in numerous patents, for example U.S. Pat. Nos. 3,007,878, 3,252,917, 3,139,406, 3,620,978, 3,719,607

3,745,126 and 3,956,171, GB patent 1265550 and CA patent 953605. The surface modification does not significantly change the size of the silica particles. The average particle size and the particle size distribution can therefor be controlled when preparing the starting anionic silica sol. In order to obtain the required average particle size and particle size distribution, the reaction time has to be carefully controlled at chosen pH and temperature, see for example U.S. Pat. Nos. 2,244,325 and 2,574,902. However, most of the commercially available cationic sols are too acidic and contain too much of chloride or other dissolved anions, and must therefore be modified prior to use in the present method. The modification involves purification by removal of chloride and/or other anions, and deacidifying the sol to suitable pH. The purification can be achieved by membrane methods such as dialysis or ultrafiltration, or by ion-exchange.

In a preferred silica sol to be used, the average particle size, i.e. the mean particle diameter by numbers, may for example be within the range from about 1 to about 150 nm, but preferably the average particle size is within the range from about 10 to about 70 nm, and most preferably from about 20 to about 50 nm. The particle size distribution can be from almost monodisperse mean particle size, the standard deviation of the particle diameter for example being less than 10% by numbers of the mean particle diameter, and up to very wide, the standard deviation for example being up to or above about 140% by numbers of the mean particle diameter. Thus, if the mean particle diameter by numbers is about 35 nm, the standard deviation by numbers may for example be from below about 3.5 nm and up to or more than about 50 nm. Suitably, the particle size distribution is wide, the standard deviation of the particle diameter preferably being above about 30%, most preferably above about 55% by numbers of the mean particle diameter, and preferably below about 115%, most preferably below about 85% by numbers of the mean particle diameter. Both relatively large average particle size as well as broad particle size distribution enhance the high density of the silica layer formed at the surface of the treated material.

The molar ratio of metal oxide to silica is preferably within the range from about $2 \cdot 10^{-5} \cdot Å$ to about $2 \cdot 10^{-3} \cdot Å$, most preferably from about $1 \cdot 10^{-4} \cdot Å$ to about $8 \cdot 1^{-4} \cdot Å$, A being the specific surface area of the silica particles in $m^2$ per gram, which area easily can be determined using BET method. If the above ratio is too low the sol becomes unstable, if the ratio is too high the sol becomes more expensive and also unstable. The dry content of the sol is not critical and may for example be from about 5 to about 60% by weight, preferably from about 20 to about 50% by weight. Preferably, the dry content of the sol substantially consists of silica and metal oxide/hydroxide.

The carbonatic material to be protected may for example include carbonatic stone such as limestone, dolomite, marble or calcareous sandstone, but also plaster, lime mortar or concrete. The method is useful for treating plain or painted surfaces of existing buildings, wallings, statues or other monuments, but also for treating blocks of stone or prefabricated building elements made of carbonatic material.

The silica sol may be applied to the surface with conventional coating methods such as brushing, rolling, spraying or dipping, the protective layer being obtained after one or several subsequent treatments. The sol may also be included in a composition containing colorants and/or silicon resins having water repellent properties, thus providing a multi-purpose coating composition.

In a preferred method, the carbonatic material is pretreated with a silica sol capable of penetrating deep into the pore system, preferably more than about 2 mm, most preferably more than about 10 mm. The pretreatment may be performed with an anionic silica sol comprising negatively charged dense non-agglomerated silica particles, the pH of the sol preferably being from about 7 to about 10.

When an anionic silica sol is applied to the surface of a porous material, the sol penetrates into the pores by means of capillary forces. No chemical reaction occurs, but due to decrease of the mean interparticle distance, the sol gels inside the pores. The porous material acts as a sieve which stops larger sol particles at narrowings separating void spaces. When the critical concentration of the particles is exceeded, a 3-dimensional gel structure starts to grow and fills the pore space, resulting in a thick layer of silica inside the porous material. The depth of the penetration depends on the silica content in the sol, a low silica content resulting in deep penetration before gelling, in many cases up to 20 or 60 mm. In order to obtain a thick uniform silica layer inside the porous material, the treatment is preferably performed with a diluted silica sol and most preferably repeated one or several times after drying of the first layer. After the final treatment, the surface layer of the carbonatic material is preferably substantially saturated with silica sol.

A deep silica layer gives improved protection of the treated material. Further, the silica gel can transport water and salts dissolved therein out of the pore system, thus avoiding accumulation of the salts in the porous material.

The anionic silica sol should contain as small amounts as possible of metal cations, particularly alkali metal cations such as $Na^+$, $K^+$ and $Li^+$, since these ions may form salts easily soluble in water, involving the risk for the salts to be transported into the pore system inside the treated material where they can crystallize and destroy the material. The content of alkali metals expressed as $Na_2O$ should preferably be less than 0.1% by weight, most preferably less than 0.05% by weight. Therefore, the stabilizing counterions of the sol should mainly consist of other ions, preferably volatile cations such as $NH_4^+$, evaporating as ammonia from the material treated and leaving a clean alkali metal free protective layer. Further examples of useful stabilizing cations are amines and quaternary amines. The silica content in the sol is preferably from about 5 to about 60% by weight, most preferably from about 10 to about 40% by weight. Regarding the preferred average particle size and particle size distribution, the same values as for the cationic silica sol applies. Suitable anionic sols are commercially available, for example under the trade mark Bindzil® 40NH3/80 (Eka Nobel AB, Bohus, Sweden).

As appears from the above description, a particularly preferred method of protecting a surface of a carbonatic material comprises the following subsequent steps:

(a) treatment with an anionic silica sol resulting in saturation of the material with silica and in formation of a silica layer from just below the surface deep into the pore system of the material treated;

(b) treatment with a cationic silica sol to form a dense protective silica layer at the surface of the treated material.

The invention also concerns a new cationic silica sol and a method of its preparation. The new cationic silica sol comprise dense, non-agglomerated positively charged particles, the surface of the particles comprising a polyvalent metal oxide/hydroxide, preferably aluminum oxide/hydroxide, the pH of the sol being from about 4 to about 7, the standard deviation of the particle diameter being above about 30% by numbers of the mean particle diameter, preferably above about 55% by numbers. Preferably, the standard deviation is below about 140% by numbers of the mean particle diameter, most preferably below about 115% by numbers, particularly below about 85% by numbers. The mean particle diameter by numbers is suitably within the range from about 1 to about 150 nm, preferably from about 10 to about 70 nm, most preferably from about 20 to about 50 nm. Preferably, the content of chloride ions and halide ions is less than about 0.05 mol/liter, most preferably less than 0.01 mol/liter, and the conductivity at pH 4 is preferably less than about $3000 \cdot 10^{-6}$ S/cm, most preferably less than about $500 \cdot 10^{-6}$ S/cm. Additional preferred features of the new sol appear from the described method of protecting a carbonatic material.

The method of preparing the new sol comprise deacidifying and/or removing anions from a cationic sol having suitable average particle size and suitable particle size distribution, the pH of the starting sol however being below about 4, for example from about 2 to about 4, or the conductivity being higher than about $3000 \cdot 10^{-6}$ S/cm, for example from about $3000 \cdot 10^{-6}$ to about $13000 \cdot 10^{-6}$ S/cm, or the content of chloride or halogenide being more than about 0.05 mol/liter. Deacidification and removal of anions may be achieved in the same operation, for example dialysis, ultrafiltration or ion exchange. Suitable starting sols are commercially available, for example the above mentioned Bindzil® (R) CAT 80.

The invention further concerns carbonatic building material such as blocks of stone or prefabricated building elements, the material comprising a thin dense surface layer of silica and a polyvalent metal oxide/hydroxide, preferably alumina, the layer being resistant to water but permeable to water vapour, and preferably being from about 0.05 to about 2 mm thick, most preferably from about 0.1 to about 0.2 mm thick. Further, the material preferably comprise a deep layer of gelled silica sol below the surface layer, preferably substantially uniformly distributed within the pores from the surface to a depth of at least about 2 mm, most preferably at least about 10 mm. Such material is obtainable by the present method of protecting a carbonatic material.

The invention is further illustrated through to following examples. The invention is however not limited to these examples, but only to the scope of the appended claims. If not otherwise stated, all percentages and parts refer to % and parts by weight.

EXAMPLE 1

In order to prepare a cationic silica sol according to the invention, the commercially available cationic silica sol Bindzil® Cat 80 was modified. The starting sol had a dry content of 43.4% by weight, contained 2.1% by weight of $Al_2O_3$ and 0.2 mol $Cl^-$ per liter. The pH of the sol was 3.5 and 3.2 ml of 0.1 N NaOH had to be used in order to titrate 1 ml of the sol to pH 7. The mean particle diameter by numbers was about 35 nm with a standard deviation by numbers of about 25 nm. About 95% by numbers of the particles had a size within the range from about 5 to about 150 nm. 35 ml of the sol were placed in a Servapor® dialysis tube and dialyzed into 1.5 liter of distilled water. The dialysis was statical with no water flow or stirring. Every 24 hour the dialyzed sol was transferred into a fresh portion of water. After 120 hours of dialysis, the resulting sol had a dry content of about 30%, pH of 5.45 and contained 0.008 mol $Cl^-$ per liter. Further, only 0.2 ml of 0.1 N NaOH was necessary in order to titrate 1 ml of the sol to pH 7. The dialysis had thus removed chlorides present both as neutral salts and as hydrochloric acid which in the starting sol is present both in free form and as bound to the surface of the sol particles. The resulting modified sol was stable.

EXAMPLE 2

A 5×5×2 cm block was cut from a soft porous limestone from Pinczow—Poland, which is a Miocene sedimentary rock, built of calcitic organic remnants, with porosity of 25% and a bulk specific gravity of 1.75 $g/cm^3$. One of its surfaces was dipped into cationic silica sol prepared according to example 1 but diluted to a dry content of about 25%. After 20 minutes of impregnation 0.5 g of dry material from the sol, corresponding to 2 g of the sol, had been taken up of the stone which then was allowed to dry in room temperature. SEM (Scanning Electron Microscopy) and XRF (X-Ray Fluorescence) analyses showed that the thickness of the protective layer was about 0.1–0.2 mm. The stone thus impregnated, as well as an untreated stone, were artificially weathered for 96 hours in a stream of humid air (RH 95–100%) having a temperature of 40° C. and containing 50 ppm $SO_2$. SEM and XRF analyses showed that the treated stone contained only trace amounts of the corrosion product $CaSO_4 \cdot 2H_2O$, whereas the untreated stone was considerably corroded.

EXAMPLE 3

In this experiment, an anionic silica sol of the trademark Bindzil® $40NH_3/80$ was used, the sol being stabilized with $NH_4^+$ and containing less than 0.05% of $Na_2O$, the pH being 9.5. The dry content was 40%, the specific surface area was 80 $m^2/g$, the mean particle diameter by numbers was about 35 nm with a standard deviation by numbers of 25 nm. About 95% by numbers of the particles had a size within the range from about 5 to about 150 nm. The above sol was diluted to a dry content of about 30%, whereupon a block of lime stone similar to those used in example 2, was impregnated with the diluted sol for 20 minutes. After that time, 2.5 g of the dry material from the sol, corresponding to 8.3 g of the sol, had been taken up by the stone. Then the block was left to dry until constant weight and the impregnation procedure was repeated. After the second impregnation, an excess of silica gel appeared at the stone surface, and further introduction of silica sol into the stone proved impossible. The 2–5 mm deep dense layer of silica significantly reduced the penetration of liquids into the stone, as was established by measuring the capillary suction of water and toluene. However, the silica layer proved permeable to water vapour.

EXAMPLE 4

Blocks of limestone similar to those used in example 2, were first treated with an anionic sol according to example 3 and then treated with a cationic sol according to example 2. After drying, the blocks were artificially weathered in a humid air containing $SO_2$. Untreated limestone and limestone impregnated just as in example 2 were weathered in the same experiment as reference samples. The artificial weathering involved the following three cycles:

(1) 2 hours treatment in an airstream having a temperature of 40° C., humidity of 95% RH and containing 55 ppm $SO_2$, the sample being cooled by cold water circulating through the sample holder, resulting in water precipitation on the surface of the sample.

(2) 5 hours treatment in an airstream having a temperature of 40° C., humidity of 95% RH and containing 55 ppm $SO_2$. The sample is not cooled, resulting in formation of sulfuric acid at the sample surface.

(3) 5 hours treatment in an airstream having a temperature of 40° C., humidity of 40% RH and containing 55 ppm $SO_2$. The sample is not cooled and the water condensed in the stone evaporates.

The above described cycles were repeated for 96 hours, whereupon the samples were examined by a SEM supplied with an energy-dispersive microanalyser in order to determine the distribution of sulfates, i.e. the corrosion products, in the cross section of the samples. The untreated blocks exhibited a thick corroded layer which showed distinct signs of disintegration. The blocks treated with cationic silica sol only, showed a corroded layer extending to about the same depth but with considerably reduced amount of the corrosion product $CaSO_4.2H_2O$ present. The blocks treated with anionic and cationic silica sols and thus comprising a composite silica layer, showed no or very little corrosion products and the state of preservation of their surface could be assessed as perfect.

What is claimed is:

1. A method of treating a surface of a carbonatic material, comprising pretreatment of the carbonatic material with an anionic silica sol capable of penetrating deeper than about 2 mm below the surface of the carbonatic material and applying to the surface an acidic cationic silica sol.

2. A method as claimed in claim 1, wherein the acidic cationic silica sol has a pH of from about 4 to about 7.

3. A method as claimed in claim 1, wherein the acidic cationic silica sol comprises positively charged particles, the particles having a surface which includes aluminum oxide/hydroxide.

4. A method as claimed in claim 1, wherein the acidic cationic silica sol has a content of chloride or other halide ions less than about 0.05 mol/liter.

5. A method as claimed in claim 1, wherein the acidic cationic silica sol has a conductivity less than about $3000 \cdot 10^{-6}$ S/cm.

6. A method as claimed in claim 1, wherein the acidic cationic silica sol has particles with mean diameter by numbers within the range from about 10 to about 70 nm.

7. A method as claimed in claim 1, wherein the acidic cationic silica sol has particles with a standard deviation of particle diameter above about 30% by numbers of mean particle diameter.

8. A method as claimed in claim 1, wherein the anionic silica sol has counter ions which include volatile cations.

9. A method as claimed in claim 1, wherein the carbonatic material is limestone, dolomite, marble, calcareous sandstone, plaster, lime mortar or concrete.

* * * * *